United States Patent Office 3,133,891
Patented May 19, 1964

3,133,891
ROOM TEMPERATURE CURABLE SILOXANE COMPOSITIONS
Louis Ceyzeriat, Lyon, France, assignor to Société des Usines Chimiques Rhône-Poulenc, Paris, France, a French body corporate
No Drawing. Filed May 17, 1961, Ser. No. 110,648
Claims priority, application France July 12, 1957
20 Claims. (Cl. 260—18)

The present invention relates to siloxane compositions and particularly to liquid or viscous organopolysiloxane compositions, susceptible of being vulcanised at low temperatures, for example atmospheric temperatures, to produce solid elastic masses.

Compositions based on organopolysiloxanes which can be vulcanised in the cold to give elastomers have already been described. Such products generally contain cross-linking agents, such as alkyl silicates or polysilicates, siloxanes containing SiH groups, silicic esters, and condensing agents or catalysts which are generally metal derivatives, e.g. derivatives of lead or tin.

With the previously known cross-linking agents, catalysts are practically always necessary even for slow vulcanisation, while for rapid vulcanisation the composition must contain catalysts which, by reason of their constitution or the proportion in which they must be used, considerably limit the fields of application of the compositions.

For certain applications, such as those in which the products are brought into contact with the skin or with the mucous membranes, for example in the case of dental mouldings, it is essential that the products employed should have no toxicity, which is rarely the case with the catalysts in the rapid setting compositions of the known type.

One of the objects of the invention is to provide compositions satisfying these conditions.

Another object is to provide compositions which are stable to storage and yet are ready for immediate use. Hitherto no such organopolysiloxane compositions have been described which are ready for immediate use but can be stored for many months after they are prepared. The previously described compositions must be prepared immediately before use, which at least with some users is highly inconvenient and entails the use of appropriate mixing equipment and the possibility of making serious mistakes.

The compositions according to the present invention can, on the contrary, be prepared in specialist workshops under proper conditions and can be stored without change until the time comes for using them. The user can therefore rely on a properly controlled product of constant composition which he does not have to prepare for himself and for which he does not have to set up special conditions and special apparatus outside his normal activities.

The new compositions according to the invention comprise a diorganopolysiloxane and an organotriacyloxysilane and may, if desired, contain liquid or solid diluents or may contain catalysts.

The diorganopolysiloxanes which may be used according to the invention have a linear structure consisting of units of the formula $R_2SiO$ and are liquids having a viscosity of 5,000 to 500,000 centistokes at 25° C., and preferably 20,000 to 100,000 centistokes, and have a content of at least 0.1% by weight of hydroxyl groups. They may be prepared from bi-functional diorganosilanes of the formula $R_2SiX_2$, freed as far as possible from mono- and tri-functional derivatives. In each of the above formulae the symbol R represents an unhalogenated or halogenated monovalent aliphatic, alicyclic or aromatic hydrocarbon radical, for example methyl, ethyl, vinyl, allyl, cyclohexyl, cyclohexenyl, phenyl and tolyl. In the second formula the symbol X represents a hydrolysable atom or group, for example a halogen atom or an alkoxy group.

The diorganopolysiloxanes may be homopolymers or co-polymers (derived from two or more different diorganosilanes) and even the organic radicals linked to any particular silicon atom may be different organic radicals. Especially useful are the dimethylpolysiloxanes, the methylphenyl polysiloxanes and the methyl-vinyl polysiloxanes.

Since it is somewhat difficult to obtain a pure bifunctional diorganosilane, it is frequently preferred to prepare the cyclic polysiloxanes such as the trimer, the tetramer or the pentamer, which are well defined and stable products. For this purpose, the bifunctional diorganosilane, $R_2SiX_2$, is first hydrolysed under conditions such as to obtain the highest possible proportion of cyclic polysiloxanes. This is the case, for example, when dimethyl dichlorosilane is hydrolysed by means of water in an ethereal medium. The cyclic diorganopolysiloxanes thus formed are isolated and then polymerised; the polymerisation involving opening the ring, for example by heating with an alkali (caustic potash or caustic soda) in the presence of water.

Other methods of preparing diorganopolysiloxanes, such as that consisting in heating, for example at 200° to 300° C., the products obtained by hydrolysis of a hydrolysable diorganosilane, previously purified by distillation or crystallisation, may be used.

The organotriacyloxysilanes used in the present invention have the general formula $R'Si(OCOR'')_3$, wherein $R'$ represents a lower alkyl group (e.g. ethyl or methyl), an alkenyl group (e.g. vinyl), an aryl group (e.g. phenyl) or an aralkyl group (e.g. benzyl) and $R''$ represents an alkyl group containing 1 to 18 carbon atoms or an aryl group. They may be used in a proportion of 0.5 to 25% by weight of the diorganopolysiloxane and preferably in a proportion of 2 to 5%. Methyl triacetoxysilane is a particularly valuable reagent. The organotriacyloxysilanes may be obtained, for example, from the appropriate alkyl, alkenyl, aryl or aralkyl trichlorosilane, generally in accordance with the processes described in French Patent No. 1,003,073 of November 29, 1946 and French Patent No. 950,583 of July 23, 1947, by the action of an organic acid, its anhydride or its alkali metal salt.

The compositions according to the present invention can consist solely of a diorganopolysiloxane and an organotriacyloxysilane. However for modifying the consistency of the unvulcanised composition or to reinforce the vulcanised products or for some other purpose, mineral fillers in the form of very fine powders may be added.

As mineral fillers there may be mentioned the various kinds of silica on the market, oxides of iron, zinc or cadmium, alumina and carbonates especially calcium carbonate. The particular filler and the proportion in which it is used will be appropriate to the particular use to which the composition is to be applied. Silicas obtained by precipitation, for example those sold under the trade names Santocel and Hi-Sil and silicas obtained by combustion, for example those sold under the trade name Aerosil, are particularly suitable for the production of reinforced elastomeric product. These silicas are microfine products formed of particles having a size of the order of 10 to 20 milli$\mu$ (i.e. 10–20 m$\mu$ or millionth of a millimetre) and have a high absorptive power. They have a large absorbent surface and are very effective even in small quantities. Fillers such as milled natural silicas and calcium carbonate can, on the other hand, be employed in larger proportions, for example 200% on the weight of the diorganopolysiloxane.

The compositions, whether containing fillers or not, may be diluted with an organic liquid which is compatible with the diorganopolysiloxane, for example white spirit or an aromatic hydrocarbon, for instance benzene, toluene or xylene.

In addition to the constituents mentioned above, the compositions of the invention may contain, for the purpose of increasing the rate of vulcanisation, certain compounds which act as catalysts. Especially useful for this purpose are oxalic acid, para-aminobenzoic acid; certain organic bases for example the ethanolamines such as mono-ethanolamine itself, diethylaminoethanol, methyl diethanolamine and morpholine, the sulphonamides such as ortho-toluene sulphonamide and urea derivatives. These compounds are generally employed in small proportions of the order of 0.1 to 2% by weight of the diorganopolysiloxanes. Organic compounds of tin may also be used as catalysts, for example tin salts of organic carboxylic acids, such as the naphthenate, the 2-ethyl-hexanoate and the benzoate, and organo-tin compounds such as dibutyl tin dilaurate and dibutyl tin diacetate. These organic compounds of tin can be used in a proportion, reckoned as tin metal, of 0.001 to 1.0% by weight on the diorganopolysiloxane.

The compositions according to the present invention are transformed into elastic solids on contact with water in the vapour or liquid state. On the other hand when prepared from anhydrous raw materials under anhydrous conditions and stored in containers which are completely fluid-tight, they remain stable and can be kept for many months without alteration; in this case, the preferred catalysts, if catalysts are to be added, are para-aminobenzoic acid and organic compounds of tin.

For effecting vulcanisation, it is sufficient merely to expose them to the atmosphere which contains sufficient humidity to bring about the reaction. Alternatively they may be brought into contact with an atmosphere having an abnormally high humidity or even saturated with water vapour or they may be treated with liquid water.

The time required for setting or solidifying is dependent on the nature of the organotriacyloxysilane, its proportion in the composition, the quantity of water in contact with the composition and the extent of the contact surface, the temperature and the presence or absence of catalysts. The compositions which are vulcanisable in the cold, that is to say at atmospheric temperatures (15° to 25° C.), can of course also be vulcanised at raised temperatures, thus increasing the speed of vulcanisation. Similarly the speed can be increased by increasing the amount of water available to the organotriacyloxysilane. By the addition of catalysts, rapid setting compositions are obtained, which when exposed to the atmosphere with a normal humidity content at about 20° C. become sufficiently solid after 1 to 3 minutes to enable them to be worked without undergoing deformation.

Various methods are available for preparing the compositions, according to the application in view. For compositions which are to be stored, marketed and then used some time after their preparation, it is important to operate under conditions excluding practically all traces of water. Such conditions are especially necessary when making compositions containing zinc oxide or cadmium oxide as filler or compositions containing catalysts.

A convenient method of operation consists in introducing the liquid diorganopolysiloxane into an apparatus provided with heating and stirring devices, then adding any fillers required and heating, for example to a temperature of 50° to 200° C. for a sufficient time to eliminate all traces of moisture. Various methods may be used together with the heating to facilitate the elimination of water, for example sweeping out with a current of dry gas. The mass is then cooled and the organotriacyloxysilane, especially methyltriacetoxysilane, added and also, if required, the catalyst and any liquid organic diluent which should be thoroughly dehydrated. The composition is then transferred, under conditions which prevent access of any water, into dry containers which are then hermetically sealed. The products thus prepared may be kept for several months and even several years.

Such conditions of preparation are also recommended for users who for various reasons wish to prepare their own compositions just before use, particularly where a noticeable evolution is to be expected from the moment of its preparation to the time of use.

In other cases of preparing the compositions just before use, particularly where the application in view does not call for very critical requirements or where the compositions are not of the rapid vulcanising type, the preparation may be carried out without special precautions against access of humidity.

A still further alternative is to conduct the preparation of the composition and the application thereof as a continuous operation, the composition being made at the same rate as it is used. Here again the operation may frequently be carried out without special precautions against moisture during the preparation stage.

The products of the invention are extremely adhesive to a variety of materials, for example wood, metals, glass, ceramic materials and plastics, and thus find a wide range of applications in sticking elements together. For this application, it is sufficient to spread a thin layer of a composition according to the present invention on the two parts of the article to be stuck, assemble the parts and leave them in contact until the setting is complete, it being possible to accelerate the setting by heat. Thus, it is possible to stick silicone elastomers together in a few seconds. In the case of metals it may be desirable to apply an appropriate pre-treatment to the metal before sticking it by the use of a composition according to the present invention.

The self-vulcanisable compositions of this invention may also serve for caulking, covering various articles (more especially electrical equipment), coating glass fabrics, protecting various supports and producing films and moulded articles, it being possible to apply these compositions by any of the usual means, e.g. dipping, doctoring or spraying.

The following examples, in which the parts are to be understood to be by weight, will serve to illustrate the invention:

The dimethyl polysiloxane oil A, used in all the examples except Examples VI, IX and XIV, is prepared by heating 5000 parts of octamethylcyclotetrasiloxane (melting point 17.5° C.) for 3½ hours under a nitrogen atmosphere at 150° C. with 5 parts of an aqueous 10% caustic potash solution. An oil is obtained, the viscosity of which in the hot state is 31,000 centistokes, and to which 16.5 parts of water are added in small fractions in 3 hours 40 minutes. The viscosity of the liquid is then 1730 centistokes in the hot state. The mixture is allowed to cool for 15 hours, and the caustic potash is then neutralised by agitation with 50 parts of silica Hi–Sil×303. The liquid obtained, which has a viscosity of 13,400 centistokes at 25° C., is thereafter heated under a current of nitrogen at about 195–200° C. in order to eliminate the volatile products. At the outlet of the water condenser, there are obtained 655 parts of liquid, while there remain in the boiler 4,345 parts of an oil (oil A) having a viscosity of 21,000 centistokes at 25° C., the percentage of the hydroxyl groups of which is 0.15%.

Example I 3 parts of methyl triacetoxysilane are added to 100 parts of the oil A. A colourless liquid is obtained, with which various tests are made:

(a) It is spread on a glass plate in a thin layer (thickness 0.5 mm.) which hardens in 30 minutes at ambient temperature.

(b) It is placed in a shallow dish, so as to form a layer of 7.5 mm. in thickness, which is found to be vulcanised after 48 hours.

(c) When applied to a wood strip, the liquid gives a transparent flexible coating after one hour.

(d) The liquid is placed between two glass plates and a light pressure is applied, which is maintained for three minutes. After 24 hours, an excellent safety glass is obtained. In fact on impact the glass breaks but remains stuck to the intermediate vulcanised layer.

*Example II*

(a) 10 parts of silica obtained by combustion ("Aerosil"), followed by 3.3 parts of methyl triacetoxysilane, are triturated in 100 parts of oil A. The viscous liquid obtained was successfully used to stick laminated glass-silicone products.

(b) 25 parts of Celite 350 silica, 1 part of oxalic acid and 3.7 parts of methyl triacetoxysilane are added to 100 parts of oil A with trituration. A mass is obtained which can readily be applied to wood or steel and which gives a flexible coating after 20 minutes.

*Example III*

500 parts of oil A are introduced into a malaxator, and 50 parts of combustion silica are added in 11 minutes, and then 250 parts of "Celite superfloss" and 50 parts of zinc oxide. After malaxation for 10 minutes, a further 500 parts of oil A are added and malaxation is continued for 20 minutes. A pasty mixture is obtained, which is used to prepare various compositions:

(a) 1.2 parts of diethyl aminoethanol is added to 135 parts of the mixture with malaxation. No apparent modification of the mixture is observed in the course of time, and the mixture is still not vulcanised after one week.

(b) 1.2 parts of diethylaminoethanol is added to 135 parts of the initial mixture. When the mixture is complete, it is again triturated with 4 parts of methyl triacetoxysilane for 1 minute on a glass plate with the aid of a spatula. The mixture thickens rapidly and is then moulded for 30 seconds and immediately used for taking dental impressions. For this purpose, it is applied between the jaws of a patient and left for about 1½ minutes. On withdrawal, it is found that the impressions of the teeth are formed with high definition in the elastic mass obtained. In the course of the operation, the patient has not noticed any taste in the composition and he has not felt any disagreeable or irritant sensation after the operation.

(c) To 135 parts of the initial mixture, there are added with trituration 5.24 parts of a mixture containing 4 parts of methyl triacetoxysilane, 1.2 part of diethylaminoethanol and 0.04 part of p-aminobenzoic acid. The mass obtained behaves in the same manner as that prepared under (b).

(d) To 135 parts of the initial mixture there are added, again with trituration, 1.2 parts of o-toluene sulphonamide and 4 parts of methyl triacetoxysilane. There is applied to the mass obtained a coin, which is withdrawn when the setting of the mass is complete, i.e. after 28 minutes. It is found that the relief of the coin is registered in the material with great accuracy.

(e) 4 parts of methyl triacetoxysilane are malaxated with 135 parts of the initial mixture. The composition obtained sets in 1 hour.

It is apparent from the foregoing tests that only composition (a), which contains no methyl triacetoxysilane, does not substantially vulcanise at room temperature.

*Example IV*

200 parts of oil A are malaxated with 80 parts of Celite 350 and 1 part of zinc oxide.

On addition of 3 parts of methyl triacetoxysilane to 100 parts of the paste, there is obtained a mass which changes into an elastic solid after 15 hours. Before being vulcanised, this composition is pressed into a mould in the form of a sheet 2 mm. thick.

On withdrawal from the mould, a specimen of dumb-bell shape is cut from the sheet obtained the calibrated portion of which is 17 mm. long and 4 mm. wide. This is a specimen of type $H_3$, Afnor Standard T46–002. The specimen is placed between the jaws of a dynamometer applying traction at a speed of 45 cm./minute. The resistance to traction is 25.6 kg./cm.$^2$ and the elongation 290%.

The Shore hardness A is 50.

After 24 hours, the resistance to traction rises to 39 kg./cm.$^2$, the elongation is 260% and the Shore hardness is 58.

*Example V*

A composition similar to that of Example III was obtained by malaxating 100 parts of the oil prepared in Example I with 25 parts of Celite 350 and 0.5 part of zinc oxide.

After the addition of 4.3 parts of methyl triacetoxysilane, a sticky pulp is obtained, which is used to stick end-to-end a tube of methyl polysiloxane elastomer having an internal diameter of 6 mm. and an external diameter of 10 mm.

The resistance to traction of the stuck product, determined after 16 hours, is 23.8 kg./cm.$^2$.

*Example VI*

A methyl- and phenyl-polysiloxane oil (oil B) having a viscosity of 62,600 centistokes at 25° C. and containing 5.6% of phenyl groupings calculated on the methyl groups was prepared from octamethylcyclotetrasiloxane and octaphenylcyclotetrasiloxane by a method similar to that described in respect of Oil A.

On addition of 3 parts of methyl triacetoxysilane to 100 parts of oil B, a liquid is obtained, which is applied to a glass plate. After 30 minutes, it is converted into a solid film (0.5 mm. thick) which adheres to the glass.

There is then prepared from the aforesaid oil B a composition similar to that described in Example III (b), only the oil employed being different. The mass obtained sets 2 minutes after the addition of the methyl triacetoxysilane.

*Example VII*

A mixture formed of 100 parts of dimethylpolysiloxane oil having a viscosity of 21,000 centistokes at 25° C. and containing 0.15% of hydroxy grouping, prepared as described above, 5 parts of combustion silica, 25 parts of diatomaceous earth, 20 parts of zinc oxide and 0.1 part of iron oxide is heated at 135° C. for 2 hours. After the heating operation, 0.66 part of diethylaminoethanol is added.

1.37 parts of methyltribenzoyloxysilane is added to 25 parts of this mixture. The mass obtained is distributed in Bakelite moulds and left in the ambient air. It is found after 24 hours that it has been transformed into an elastic solid which can be removed from the mould.

The methyltribenzoyloxysilane is prepared by the action of 9 parts of methyltrichlorosilane on 30 parts of anhydrous sodium benzoate dispersed in 100 parts of toluene. The solid obtained is filtered off and washed with toluene, and the toluene solutions are distilled first under normal pressure and then under 27 mm. Hg up to 125° C. There remains as solid whose silicon content is 6.7% (theoretical silicon content for methyltribenzoyloxysilane is 6.9%).

*Example VIII*

A mixture of 709 parts of dimethylpolysiloxane oil identical to that employed in Example I, 32.5 parts of combustion silica and 250 parts of zinc oxide is heated for 2 hours at 140° C. After cooling, 7.5 parts of dimethylaminoethanol are added to the mass.

To two portions of 100 parts each of the composition thus obtained are added respectively 2.15 and 3.25 parts of methyltripropionoxysilane. It is found that the product is solidified in 7 minutes in the first case, and in 3½ minutes in the second case.

The methyltripropionoxysilane is obtained by progressively heating to a gently boiling condition (150° C.) a mixture of 149.5 parts of methyltrichlorosilane and 222 parts of propionic acid. On heating for 20 hours, 108 parts of hydrochloric acid are recovered. 42 parts of a liquid boiling at 91° C. under 2 mm. Hg are isolated by rectification, the properties of this liquid being as follows: Si%: 10.5 (theoretical Si content for methyl tripropionoxysilane: 10.68%); acid number (determined by titration in aqueous alcoholic medium in the presence of phenolphthalein): 642 (theoretical value for methyltripropionoxysilane: 641.2); $d_4^{20}=1.09$ and $n_D^{20}=1.413$.

*Example IX*

A methyl and vinyl polysiloxane oil having a viscosity of 41,700 cst. at 25° C. was prepared from 100 parts of octamethylcyclotetrasiloxane and 0.7 part of the tetramethyltetravinylcyclotetrasiloxane by a method similar to that described above.

10 parts of this oil are malaxated with 0.8 part of silica of combustion on a glass plate, and 0.32 part of methyltripropionoxysilane is then dispersed in the mass. The mixture is spread in a layer 3 mm. thick, which is left at ambient temperature. It is found after 1 hour that the mass is no longer sticky, and after 24 hours it has the form of a translucent elastic solid.

*Example X*

100 parts of dimethylpolysiloxane oil prepared as described above and 3 parts of methyltriacetoxysilane were introduced into an apparatus, provided with an agitator, the atmosphere of which has been flushed by dry nitrogen, and the mixture was then agitated for 15 minutes. A translucent liquid was thus obtained, a part of which was employed immediately afterwards for a test application, while the remainder was kept in a fluid-tight container away from moisture.

The sample taken for the immediate test was run into a film casting apparatus and spread in a layer of a thickness of 2 mm. on a glass plate previously coated with a layer of an anti-adhesion agent consisting of the commercial anionic wetting agent sold under the trademark Teepol, and consisting of sodium secondary alcohol sulphates. The layer of product left in the ambient air at 20° C. became non-sticky on the surface after 45 minutes. After 5 hours, the product had solidified in the mass and the sheet could then be detached. The sheet thus obtained was translucent, elastic and flexible. The same operation was repeated one year later with the product which had been kept in a fluid-tight container. The layer spread on the glass plate hardened on the surface after 50 minutes and the vulcanization in the mass was complete after 4½ hours. The remainder of the stored composition was successfully used for coating a previously degreased glass fabric.

*Example XI*

50 parts of anhydrous dimethylpolysiloxane oil prepared as described above were introduced into the apparatus employed in Example X, the operation being carried out in an atmosphere of dry nitrogen. 5 parts of silica obtained by combustion, 25 parts of diatomaceous earth and 1 part of iron oxide were added with agitation. When the agitation had been continued for 1½ hours in order to homogenise the mass, 50 more parts of the same oil as before were added and the mixture was heated for 2 hours at 135–145° C. under a current of dry nitrogen to promote the elimination of the moisture introduced by the charges. The product was then allowed to cool, whereafter 28 parts of xylene and 4 parts of methyltriacetoxysilane were successively added. A sticky fluid paste of reddish-brown colour was obtained, the viscosity of which, determined on a Brookfield viscometer, was 18,000 centipoises at 25° C. The product was transferred to aluminium tubes without contact with the air.

A test application of this paste as a sticking agent for silicone elastomers was carried out immediately afterwards on a shaped article having a cross-section of 100 mm.[2]. For this purpose, the two sections were coated with the composition, exposed to the air for 3 minutes and then applied one against the other and placed between two steel plates heated at 100° C. for 1 minute. The joint formed was then sufficiently strong to permit handling of the article. Another test showed that the composition obtained permitted of sticking articles completely in the cold, but it is necessary to wait 2 hours before the assembly can be manipulated.

The same results were obtained with a specimen of the composition kept for six months.

The product was also subjected to the test employed in Example X, on the one hand immediately after its manufacture and on the other hand, after having been kept for 6 months. With the freshly prepared composition, the vulcanisation in a slightly moist atmosphere, in the case of a layer 1.5 mm. thick occurred on the surface after 45 minutes and was completed in depth after 10 hours. Investigation of the dielectric properties of the sheet obtained, on the one hand in the dry state and on the other hand after immersion in water for 24 hours at ambient temperature followed by drying, gave the following results:

| Product tested | Resistivity (in Ω/cm.²/cm.) | Angle of loss (tan δ under 1 megacycle) | Dielectric constant | Dielectric strength (in kv./mm.) |
| --- | --- | --- | --- | --- |
| Sheet as obtained | $1.3 \times 10^{15}$ | $16 \times 10^{-4}$ | 2.95 | 18 |
| Sheet after immersion in water followed by drying | $8 \times 10^{14}$ | $40 \times 10^{-4}$ | 2.95 | 16 |

With the product which had been kept in tubes for six months, and the appearance of which was unchanged, vulcanisation in an atmosphere having the same humidity and with a layer of the same thickness (1.5 mm.) was effected on the surface in 30 minutes and in the mass in 7 hours.

By repeating the preparation of a film 1.5 mm. thick with the product kept for 6 months, but operating in a more humid atmosphere (percentage relative humidity=90) there was obtained in 1½ hours a film which could be readily detached from the glass plate.

A rapid setting of this same organopolysiloxane composition was also effected by immersing in cold water a glass plate coated with the said composition.

In another test, a glass plate coated with a thickness of 3 mm. of this same composition was subjected to the action of steam under a pressure of 0.600 kg. in an autoclave. After releasing the pressure, at the end of 30 minutes, there was obtained a film having high tenacity and good elongation.

The composition was also employed with success for coating capacitors and semi-conductors.

*Example XII*

To 100 parts of dimethylpolysiloxane oil not freed from volatile matter (hot viscosity 1730 centistokes), there were added with agitation 5 parts of silica obtained by combustion, 25 parts of diatomaceous earth and 1 part of iron oxide. The mixture was heated for 6 hours at 135–145° C., the apparatus then being opened to eliminate the volatile constituents of the oil and the moisture. After cooling there were added 10.6 parts of xylene and 3.7 parts of methyltriacetoxysilane containing 0.04 part of p-aminobenzoic acid.

A part of the composition obtained was diluted with xylene and then applied by a spray gun to a large glass plate coated with "Teepol" in such manner as to obtain a sheet 2 mm. thick which was detached from its support 24 hours after the application. The mechanical properties of the sheet were determined on a testpiece of type H₃ (Standard Afnor T46-002) cut from the sheet. The tensile strength was 34 kg./cm.² and the elongation 440%.

The same test was repeated on that part of the composition which had not been used and which had been kept in a fluid-tight container for 4 months. The results were as satisfactory as with the freshly prepared composition.

*Example XIII*

To 100 parts of dimethylpolysiloxane oil similar to that employed in Example XII there were added, with agitation, 200 parts of powdered calcium carbonate and then 104 parts of xylene, and the water was eliminated and a part of the xylene removed by azeotropy. To the remaining mixture, which still contained 52 parts of xylene, were added 9 parts of methyltriacetoxysilane, and the thick liquid obtained was then run into a tightly closing receptacle.

After one month, the composition was used as a caulking agent to stop interstices in wood and brickwork and to make joints between glass and metal and glass and wood.

*Example XIV*

3 parts of methyltriacetoxysilane were added to 100 parts of a methyl- and phenylpolysiloxane oil having a viscosity of 62,600 centistokes at 25° C., containing 5.6% of phenyl groupings calculated on the methyl groups, and prepared as described in Example VI from octamethylcyclotetrasiloxane and octaphenylcyclotetrasiloxane. The product obtained, which was spread in a layer 0.5 mm. thick, set in 2 hours in the atmosphere. After being kept for 2 months away from moisture, the setting time in the atmosphere was about 2½ hours for the same thickness of product.

*Example XV*

Into the apparatus employed in Example X, operated under a dry nitrogen atmosphere, were introduced 50 parts of anhydrous dimethylpolysiloxane oil prepared as described above. There were then added with agitation 5 parts of silica obtained by combustion, 25 parts of diatomaceous earth and 1 part of iron oxide. When the agitation had been continued for 1½ hours, in order to homogenise the mass, there were again added 50 parts of the same oil as before, and the mixture was heated for 2 hours at 135–145° C. under a current of dry nitrogen to promote the elimination of the moisture introduced by the charges. The product was allowed to cool, 4.7 parts of methyltripropionoxysilane were added, and the product was malaxated for 30 minutes and transferred into aluminium tubes.

A specimen representing 10 parts of the freshly prepared product was spread on a glass plate previously coated with a layer of "Teepol" used as an anti-adhesion agent. After 10 minutes in the atmosphere, the mass had set on the surface. After 24 hours, it had completely solidified, and the sheet obtained could be detached from the glass plate without difficulty.

The same test was carried out with the product preserved in tubes for 9 months and it was observed that the paste had not varied and that it set in the ambient air.

*Example XVI*

A test similar to that described in Example XV was carried out, using 6.3 parts of ethyltriacetoxysilane instead of 4.7 parts of methyltripropionoxysilane.

The test for the immediate use of the composition to form a film, carried out as in Example X showed solidification on the surface at the end of 35 minutes, setting in depth permitting detachment of the sheet taking place in less than 24 hours.

The portion kept for 6 months in aluminium tubes had not changed and set normally on exposure to air.

*Example XVII*

A composition similar to that described in Examples XV and XVI, but employing 3.9 parts of methyltribenzoxysilane was prepared.

The paste obtained, spread on a glass plate coated with Teepol, was covered with a vulcanised film after about 10 minutes in the atmosphere, and vulcanisation in depth took place within about 20 hours.

The same results were observed on a product kept in aluminium tubes for more than 10 months at room temperture.

*Example XVIII*

Into an apparatus provided with a stirrer and from which the atmosphere has been flushed out by means of nitrogen, are introduced under an atmosphere of dry nitrogen 50 parts of anhydrous dimethylpolysiloxane oil prepared as described above, whereafter there are added with stirring 5 parts of silica obtained by combustion, 25 parts of diatomaceous silica and 1 part of iron oxide. When the stirring has been continued for 1 hour 30 minutes to homogenise the mass, a further 50 parts of the same oil are added and the mixture is heated for 2 hours at 135–145° C. under a current of dry nitrogen to promote the elimination of the humidity introduced by means of the fillers. After cooling, a composition A is obtained.

100 parts of product A are withdrawn, the operation being carried out under dry nitrogen, and 3 parts of methyltriacetoxylsilane are added thereto with trituration. There is thus obtained a mixture B which, when spread in a thin layer on a glass plate, sets on the surface in 17 minutes. When kept in an aluminium tube in the absence of air, it is unchanged after 8 months.

Two further lots of mixture B are prepared, each of 103 parts:

(a) To one of these lots is added 1 part of dibutyl-tin dilaurate. The mixture is kept away from the air. When it is spread in a thin layer in the ambient air, it is found that after 3 minutes it has solidified on the surface. When observed after storage for 8 months in an aluminium tube, it is substantially unchanged and its setting time has not changed.

(b) To the other lot is added 1 part of stannous octoate. A sample of the mixture, when spread in the air, sets in less then 7 minutes while the composition when kept away from moisture is unchanged after 8 months.

*Example XIX*

To 100 parts of mass A prepared as in Example XVIII are added, again in the absence of moisture, 1.5 parts of methyltriacetoxysilane and 0.5 part of dibutyl-tin dilaurate. The mixture obtained is kept in a fluid-tight metal container. One part of the product, spread in the ambient air, hardens on the surface in less than one minute. One trituration of another part of the product with an equal quantity of composition A which has been left in the moist air, there is observed an even shorter setting time, of the order of a few seconds.

This application is a continuation in part of my earlier applications Serial No. 716,029 filed February 19, 1958, now abandoned, Serial No. 780,947 filed December 17, 1958, now abandoned, Serial No. 788,777 filed January 26, 1959, now abandoned, Serial No. 833,684 filed August 14, 1959, now abandoned and Serial No. 65,263 filed October 27, 1960, now abandoned.

I claim:

1. Compositions vulcanisable in the presence of water, which comprise a linear diorganopolysiloxane consisting of units of the formula $R_2SiO$ in which each R represents a monovalent radial selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals.

2. Compositions vulcanisable in the presence of water, which comprise a linear diorganopolysiloxane consisting of units of the formula $R_2SiO$ in which each R represents a monovalent radial selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals, the said composition further containing a filler.

3. Compositions vulcanisable in the presence of water, which comprise a linear diorganopolysiloxane consisting of units of the formula $R_2SiO$ in which each R represents a monovalent radial selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals, the said composition further containing a filler and a solvent.

4. Compositions vulcanisable in the presence of water, which comprise a linear diorganopolysiloxane consisting of units of the formula $R_2SiO$ in which each R represents a monovalent radial selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals, the said composition further containing an accelerator selected from the group consisting of oxalic acid, p-aminobenzoic acid, ethanolamine, morpholine, diethylaminoethanol, methyldiethanolamine, o-toluene sulphonamide and organic derivatives of tin.

5. Compositions vulcanisable in the presence of water, which comprise a linear diorganopolysiloxane consisting of units of the formula $R_2SiO$ in which each R represents a monovalent radial selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals, the said composition further containing a filler and an accelerator selected from the group consisting of oxalic acid, p-aminobenzoic acid, ethanolamine, morpholine, diethylaminoethanol, methyldiethanolamine, o-toluene sulphonamide and organic derivatives of tin.

6. Compositions vulcanisable in the presence of water, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl aryl and aralkyl hydrocarbon radicals and $R''$ represents a monovalent radical selected from the group consisting of alkyl radicals containing 1 to 18 carbon atoms and aryl radicals, the said composition further containing a filler, a solvent and an accelerator selected from the group consisting of oxalic acid, p-aminobenzoic acid, ethanolamine, morpholine, diethylaminoethanol, methyldiethanolamine, o-toluene sulphonamide and organic derivatives of tin.

7. Compositions vulcanisable in the presence of water, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals.

8. Compositions vulcanisable in the presence of water, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula $R'Si(OCOR'')_3$, in which $R'$ represents a monovalent radical selected from the group consisting of lower alkyl, alkenyl aryl and aralkyl hydrocarbon radicals and $R''$ represents a monovalent radical selected from the group consisting of alkyl radicals containing 1 to 18 carbon atoms and aryl radicals, the said composition further containing 0.1% to 2% by weight, based on the diorganopolysiloxane, of an accelerator selected from the group consisting of oxalic acid, p-aminobenzoic acid, ethanolamine, morpholine, diethylaminoethanol, methyldiethanolamine, o-toluene sulphonamide and organic derivatives of tin.

9. Compositions vulcanisable in the presence of water, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysilonxane, of an organotriacyloxysilane of the formula $R'Si(OCOR'')_3$, in which $R'$ represents a monovalent radical selected from the group consisting of lower alkyl, alkenyl, aryl and aralkyl hydrocarbon radicals and $R''$ represents a monovalent radical selected from the group consisting of alkyl radicals containing 1 to 18 carbon atoms and aryl radicals, the said composition further containing 0.001% to 1% by weight, calculated as tin and based on the diorganopolysiloxane, of an organic derivative of tin.

10. Compositions vulcanisable in the presence of water, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula $$R'Si(OCOR'')_3$$

in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing 0.001% to 1% by weight, calculated as tin and based on the diorganopolysiloxane, of dibutyl tin dilaurate.

11. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals.

12. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing a filler.

13. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which R' represents a monovalent radical selected from the groups consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing a filler and a solvent.

14. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated at the diorganopolysiloxane, of an organotriacyloxysilane of the formula $R'Si(OCOR'')_3$, in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing an accelerator selected from the group consisting of p-aminobenzoic acid, and organic derivatives of tin.

15. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $R'Si(OCOR'')_3$, in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing a filler and an accelerator selected from the group consisting of p-aminobenzoic acid, and organic derivatives of tin.

16. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 0.5% to 25% by weight, calculated on the diorganopolysiloxane, of an organotriacyloxysilane of the formula $$R'Si(OCOR'')_3$$

in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals, the said composition further containing a filler, a solvent and an accelerator selected from the group consisting of p-aminobenzoic acid, and organic derivatives of tin.

17. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula $$R'Si(OCOR'')_3$$

in which R' represents a monovalent radical selected from the group consisting of lower alkyl, alkenyl, aryl and aralkyl hydrocarbon radicals and R'' represents a monovalent radical selected from the group consisting of alkyl radicals containing 1 to 18 carbon atoms and aryl radicals.

18. Compositions which are moisture-free, vulcanisable in the presence of water and which are stable in storage, which comprise a linear diorganopolysiloxane consisting of units of the formula $R_2SiO$ in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula R'Si(OCOR")$_3$, in which R' represents a monovalent radical selected from the group consisting of lower alkyl, alkenyl, aryl and aralkyl hydrocarbon radicals and R" represents a monovalent radical selected from the group consisting of alkyl radicals containing 1 to 18 carbon atoms and aryl radicals, the said composition further containing 0.1% to 2% by weight, base on the diorganopolysiloxane, of an accelerator selected from the group consisting p-aminobenzoic acid, and organic derivatives of tin.

19. Compositions which are moisture-free, vulcanisable in the presence of water and which are stable in storrage which comprise a linear diorganopolysiloxane consisting of units of the formula R$_2$SiO in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula R'Si(OCOR")$_3$, in which R' represents a monovalent radical selected from the group consisting of lower alkyl, alkenyl, aryl and aralkyl hydrocarbon radicals and R" represents a monovalent radical selected from the group consisting of alkyl radicals containing 1 to 18 carbon atoms and aryl radicals, the said composition further containing 0.001% to 1% by weight, calculated as tin and based on the diorganopolysiloxane, of an organic derivative of tin.

20. Compositions which are moisture-free, vulcanisable in the presence of water and which are stable in storage, which comprise a linear diorganopolysiloxane consisting of units of the formula R$_2$SiO in which each R represents a monovalent radical selected from the group consisting of halogenated and halogen-free aliphatic, alicyclic and aromatic hydrocarbon radicals and containing at least 0.1% by weight of hydroxyl groups and also comprise 2% to 5% by weight, calculated on the diorganopolysiloxane, of an organotriacyloxysilane of the formula $$R'Si(OCOR")_3$$

in which R' represents a monovalent radical selected from the group consisting of lower alkyl, alkenyl, aryl and aralkyl hydrocarbon radicals and R" represents a monovalent radical selected from the group consisting of alkyl radicals containing 1 to 18 carbon atoms and aryl radicals, the said composition further containing 0.001% to 1% by weight, calculated as tin and based on the diorganopolysiloxane, of dibutyl tin dilaurate.

References Cited in the file of this patent
UNITED STATES PATENTS

| | | |
|---|---|---|
| 2,615,861 | Peyrot et al. | Oct. 28, 1952 |
| 2,843,555 | Berridge | July 15, 1958 |
| 2,985,546 | Leavitt | May 23, 1961 |
| 2,999,077 | Nitzsche | Sept. 5, 1961 |
| 3,035,016 | Bruner | May 15, 1962 |

Disclaimer and Dedication

3,133,891.—*Louis Ceyzeriat*, Lyon, France. ROOM TEMPERATURE CURABLE SILOXANE COMPOSITIONS. Patent dated May 19, 1964. Disclaimer and dedication filed May 31, 1973, by the assignee, *Rhone-Poulenc S.A.*

Hereby disclaims and dedicates to the Public claims 4, 5, 6, 8, 9, 10, 14, 15, 16, 18, 19 and 20 of said patent.

[*Official Gazette October 30, 1973.*]